INVENTOR
DAVID N. LAUDER,
BY E. V. Jadd, Jr.
ATTORNEYS

Oct. 18, 1960        D. N. LAUDER        2,956,493
AUTOMATIC SEQUENCE CONTROL FOR PHOTOCOMPOSING MACHINE
Filed July 1, 1957        2 Sheets-Sheet 2

VACUUM CONTROL

| NO. | VAC. IN | PRESS IN | PRESS OUT |
|---|---|---|---|
| A | x | x | o |
| B | o | o | x |
| C | x | o | o |
| D | o | o | x |

MANUAL AUTOMATIC

| NO | MANUAL | AUTOMATIC |
|---|---|---|
| A | x | o |
| B | o | x |
| C | x | o |
| D | o | x |

INTEGRATOR TIMER

| NO | TIMER | OFF | INTEGRATOR |
|---|---|---|---|
| A | o | o | x |
| B | x | o | o |
| C | o | o | x |
| D | x | o | o |
| E | o | o | x |
| F | x | o | o |
| G | o | o | x |
| H | x | o | o |

INVENTOR
DAVID N. LAUDER,
BY E. V. Judd, Jr.
ATTORNEYS

United States Patent Office 2,956,493
Patented Oct. 18, 1960

2,956,493

AUTOMATIC SEQUENCE CONTROL FOR PHOTOCOMPOSING MACHINE

David N. Lauder, Dumont, N.J.

Filed July 1, 1957, Ser. No. 669,057

5 Claims. (Cl. 95—76)

This invention relates to an automatic sequence control arrangement for a photocomposing or step-and-repeat machine. The machine is of the type disclosed in Patents Numbers 2,174,726 and 2,203,094. The main object of the invention is to eliminate as much manual control as possible.

In a machine of the type to which the invention is directed, it is desired to transfer information or design from a negative to a photosensitive press plate or to another negative. Hereafter, the term "press plate" will be used for convenience, but it is to be understood that its equivalents, such as a negative, are included within the scope of the invention.

The negative is mounted in a frame with a lamp adapted to be positioned adjacent the negative to shine light through the negative onto the press plate. The press plate is mounted on a backboard which is movable into engagement with the frame. An arrangement for introducing a vacuum between the negative and the press plate is provided to draw the negative tightly against the press plate to avoid, insofar as possible, any undercutting by the light source.

When the vacuum has been applied, the light source is turned on and, after a predetermined time, the light source is turned off, the vacuum released, and the backboard is moved away from the frame in which the negative is mounted.

In the past, the performance of these operations in their proper sequence has been done manually and the skill and care of the operator has been greatly relied upon. It is the object of the present invention to permit the sequence of the operations to be continued automatically.

It is another object of the invention to provide an automatic sequence control circuit for a photocomposing machine of the type described above, the operation of which can be made dependent upon either a light integrator or a timer.

It is another object of the invention to provide an automatic sequence control circuit which has an arrangement by which the operations may all be performed manually.

These and other objects of the invention will become more readily apparent from the following detailed description of the invention taken in conjunction with the accompanying drawings in which.

Figures 2, 3, 4, 5:
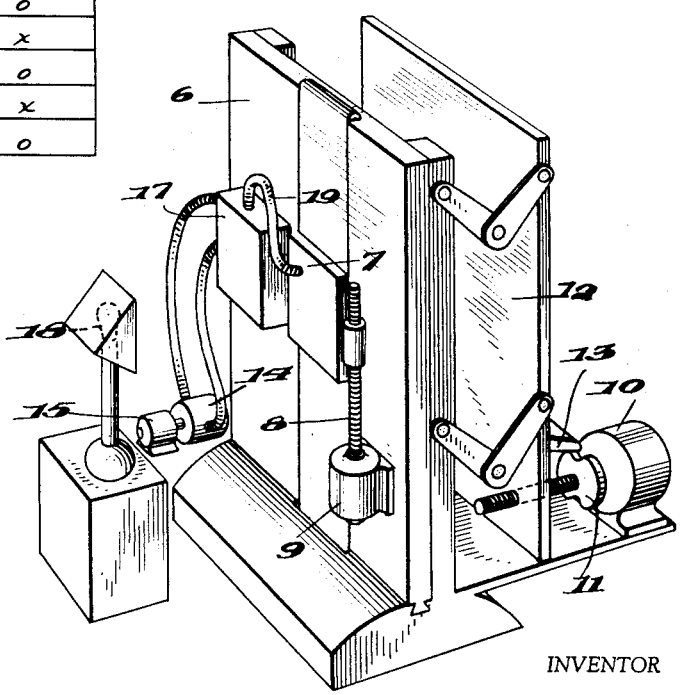
Figs. 2 to 4 are tables showing the open or closed position of the contacts of the vacuum control switch, the manual or automatic switch, and the integrator or timer switch, respectively.
Fig. 5 is a diagrammatic illustration of the principal components of the machine which are controlled by the circuit of Fig. 1.

In Fig. 5, a very diagrammatic illustration of the photocomposing machine and its component parts is set forth. The actual machine is well illustrated, however, in Patents Numbers 2,174,726 and 2,203,094.

The essential elements of the machine include a mounting panel 6 which is movable in a horizontal direction and to which is mounted the frame 7 for holding the negative. The frame 7 is vertically movable with respect to the backboard 6 and has a screw 8 driven by motor 9 for that purpose.

A backboard 12 is movable toward and away from the panel 6, by means of motor 10. In actual practice, the motor 10 is unidirectional and is connected through a suitable linkage so that the backboard 12 will move in and out as the motor continues to rotate.

The motor has associated therewith a cam 11 which operates a limit switch follower 13. Limit switch follower 13 causes the operation of limit switch LS–1 to be described in connection with Fig. 1.

A compressor 14 driven by a motor 15 is connected by hoses 16 to control box 17. One hose leads from the vacuum side of the compressor and the other leads from the high pressure side. An electrically operated valve connects either the vacuum hose or the high pressure hose to the air hose 19 which is connected to frame 7. This system determines whether the frame will be under a vacuum or pressure.

A lamp 18, positionable opposite frame 7, is also provided and is controlled from the control box by the circuit described in connection with Fig. 1.

The sequence of operation of the device described is as follows:

The frame 7 is adjusted to the proper position by moving the frame either up or down and by moving the panel 6 either left or right as required. Backboard 12, containing the press plate is moved in until an air tight engagement is formed between the frame 7 and the backboard 12. The valve associated with the compressor switches to vacuum, drawing the negative in the frame 7 tightly against the press plate. The lamp 18 is lit for a predetermined period of time and then is turned off. The pressure valve then switches from vacuum to pressure and the backboard moves out.

As indicated above, in accordance with the present invention, provision has been made for initiating all of the above described operations in their proper sequence upon pushing of the one start button.

*Automatic sequence circuit*

Figure 1:
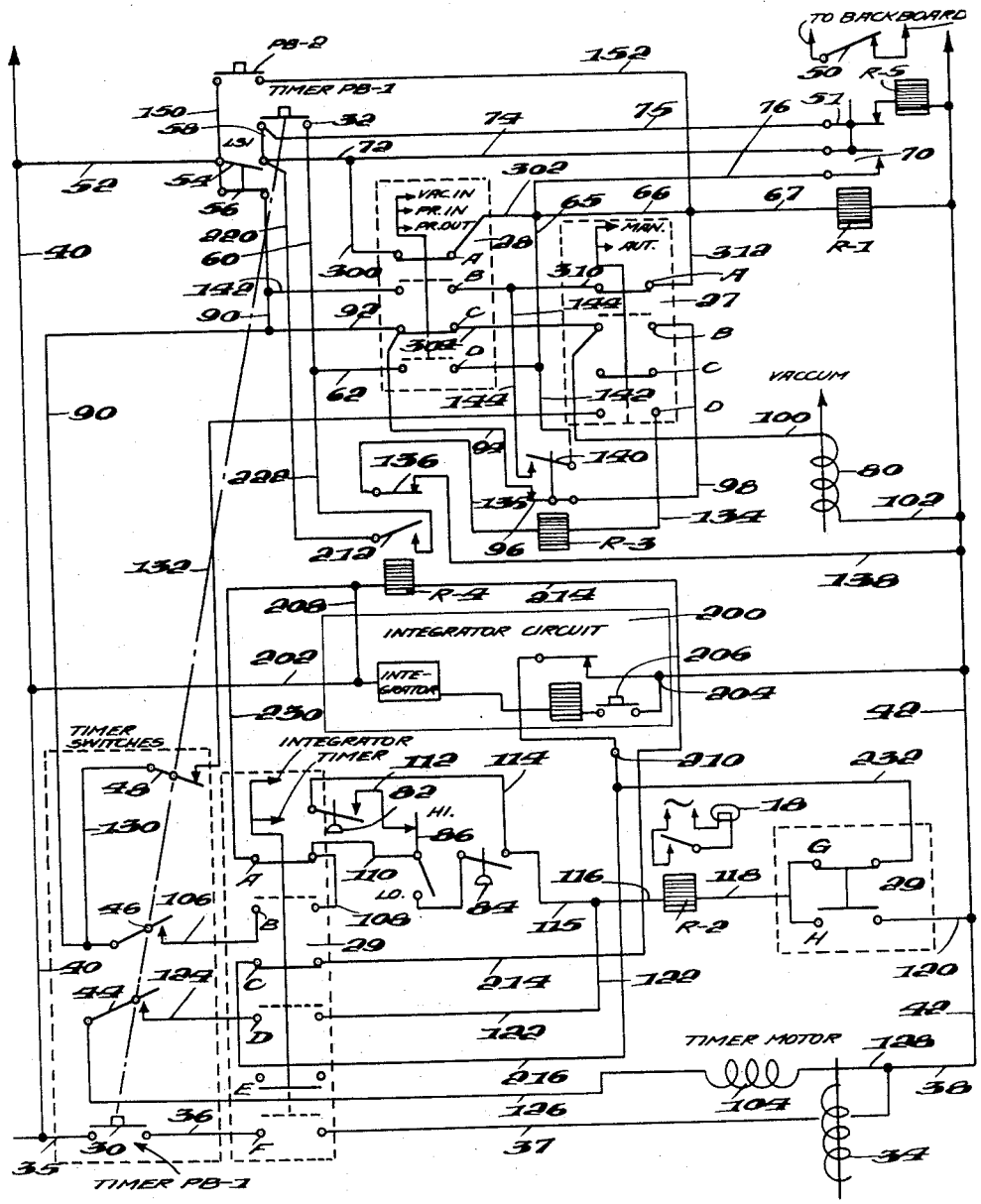
Fig. 1 is a circuit diagram of the automatic sequence control circuit.

The circuit diagram which provides the automatic sequence of operations is shown in Fig. 1. The sequence of operations can be performed manually, as described below or can be controlled by a timer or can be controlled by a light integrator.

*Timer controlled operation in automatic sequence control*

Prior to the initiation of the operation, selector switch 27 is set to automatic operation closing contacts 27B and 27D. The vacuum selector switch 28 is set at "Press-Out" closing contacts B and D. The meter timer selector switch 29 is set to "Timer" closing contacts 29B, 29D and 29F.

The timer per se is of known design and has means for setting the desired length of time during which the light is to be on to transfer the image in the negative to the plate or the film or the like mounted on the backboard. Its operation is begun by pushing push-button PB–1 which has ganged contacts 30 and 32 which momentarily close and are broken by release of the push-button. Contact 30 closes the circuit to the timer magnetically operated clutch 34 through leads 35, 36, 37 and 38 which are connected to a 110-volt supply 40 and 42.

Energization of timer clutch 34 causes the timer pointer to snap to the pre-set time and mechanically closes switches 44, 46 and opens switch 48. The position of these switches will be reversed when the movable timer pointer reaches the end of the pre-set timing period.

Relay R-5 adds a safety interlock feature. Relay R-5 controls the motors which move frame 18 vertically and panel 6 horizontally. These motors cannot be operated unless relay R-5 is energized.

The energization of safety relay R-5 is controlled by normally closed contact 51 on relay R-1. Accordingly, safety relay R-5 will be energized through lead 52, contact 54, leads 58, 76 and contact 51 only when relay R-1 is de-energized. This occurs only when backboard 12 is in its extreme out position.

The "in" and "out" movement of backboard 12 is controlled by relay contacts 50 operated by relay R-1. Relay R-1 is connected in a circuit through leads 52, limit switch LS-1, having contacts 54 and 56, lead 58, contact 32, lead 60, 62, vacuum selector contact 28D, lead 64, 65, 67 and 68. Limit switch LS-1 takes the position as shown when the backboard is moved in against the negative holder and reverses its poistion when the backboard reaches its extreme "out" position away from the negative holder. The limit switch is operated by the cam 11 driven by the motor which moves the backboard 12 in and out (Fig. 2).

Relay R-1 is "held in" until the limit switch LS-1 closes contact 56 and opens contact 54 by contact 70 connected to the line 40—42 through lead 52, contact 54, lead 72, 74, 76, 66, 67 and 68.

When the backboard moves all the way in, limit switch LS-1 is operated to close contact 56 and to open contact 54, thereby de-energizing relay R-1 which disconnects the backboard motor 10 from the line.

*Vacuum and pressure control*

The compressor 14 has a vacuum control valve which applies either pressure or vacuum to the system as described above. The valve is controlled by a solenoid 80 to switch line 16 to "vacuum" when solenoid 80 is energized. Also in the vacuum and pressure lines are diaphragm switches 82 and 84. Switch 82 is set to close when a high vacuum is reached, and switch 84 is set to close when a low vacuum is reached. A manually operated selector switch 86 determines which of the switches 82 or 84 will control the operation. The diaphragm switches directly control the operation of the light 18 through a relay R-2 so that the light 18 will not be turned on until the desired vacuum is reached.

When the backboard has moved into its "in" proper position, sealing the negative against the plate, contact 56 is closed connecting line 90 to main line 40. When contacts 56 are closed, solenoid 80 is immediately energized through the following path: Leads 92, 94, contact 96 on time delay relay R-3 (normally closed) lead 98 contact 27B lead 100 and 102.

When the vacuum reaches the desired level, timer motor 104 and lamp 18 are operated. Lamp 18 is energized through relay R-2 to which voltage is applied through the following circuit: Live lead 90, timer operated switch, lead 106, contact 29B, lead 108, 110, contact 86, lead 112, diaphragm contact 82, lead 114, 115, 116, 118, contact 29H and lead 120 to line 42.

Simultaneously contact 104 is connected into the circuit through the following circuit: Lead 122, connected between leads 115 and 116, contact 29D, lead 124, timer contact 44, lead 126, lead 128 and lead 38 connected to line 42.

In the circuit thus far established, the vacuum remains applied and the lamp 18 lit until the timer pointer has completed its movement through the duration of the preselected time. At the end of its movement, switches 44, 46 and 48 are reversed. At this point, the vacuum control valve 16 is reversed to apply pressure between the negative and plate and to begin the movement of the backboard out after a slight delay.

The circuit for effecting this operation is as follows: The vacuum control valve which was energized through contact 96 (normally closed) of relay R-3 will be opened when relay R-3 is energized. Relay R-3 is energized through the following circuit: Lead 130 coming off of lead 90, timer contact 48, lead 132, contact 27D, lead 134, normally closed, contact 136 on relay R-4 and lead 138 to main line 42.

It is desirable to delay the outward movement of the backboard for a moment or two until the vacuum control valve is reversed and a pressure has been built up between the negative and the plate. Otherwise, the movement of the backboard would tend to rip the negative and plate apart. Accordingly, associated with relay R-3 is a time delay contact (normally opened) 140. After a momentary delay until the condition described above has been met, contact 140 closes, energizing relay R-1 through the following circuit: Lead 142, connected to line 90, contact 28B, lead 144, contact 140, lead 142, lead 65, 66, 67 and 68 to main line 42. Energization of relay R-1 closes the circuit to the backboard motor 10 and backboard motor moves outwardly until it reaches its furthermost rearward location, at which point limit switch LS-1 is again reversed to the position shown in the drawing and the operation is ready to begin again.

A reset line consisting of push-button PB-2 and leads 150, 152 is used to connect relay R-1 directly to the main lines 40 and 42 in the event that a power failure or the like should cause the backboard to be "hung up" between its forward or rear positions without means for obtaining energy to complete its movement from the automatic circuit.

*Summary of timer operation*

Push-button 1 begins the operation by energizing relay R-1 causing the backboard to move in. When the backboard moves in, limit switch LS-1 shifts its position to that shown in the drawings causing the energization of solenoid 80 to operate vacuum control valve 16. Vacuum is applied between the plate and the negative until the level of vacuum determined either by diaphragm switch 82 or diaphragm 84 is reached. When the desired level of vacuum is reached, the closing of either switch 82 or 84 causes the simultaneous operation of timer motor 104 and lamp 18. At the end of the predetermined time of operation, the timer motor pointer automatically drops out timer switches 44 and 46 and closes timer switch 48. The timer motor 104 and lamp 18 are shut off. Contact 48 permits the energization of relay R-3 which opens the circuit to a vacuum control valve solenoid 80 and, after a momentary delay to permit the build up of pressure between the plate and the negative, contact 140 associated with relay R-3 re-energizes relay R-1 to move the backboard out again.

*Automatic operation with light integrator*

In certain operations, it may be desired to time the exposure to light on the basis of the quantity of light or lumens rather than the time that the particular light has been on. In such a situation, the timer controls are not used and substituted therefor is a light integrator of known design. For example, in the embodiment described, the Essar integrator is used.

The integrator, indicated at 200 in Fig. 1 is provided with terminals at 202 and 204 to be connected to main leads 40 and 42, respectively. A push-button indicated at 206 initiates the operation of the integrator and provides a source of voltage at terminals 208 and 210. Means is also provided in the integrator for determining the quantity of light impinging on an associated photo cell and, when such quantity is received, to interrupt the voltage source at points 208 and 210. It is to be understood that the illustrated circuit is purely diagrammatic for convenience.

It will be noted from considering the circuit diagram of Fig. 1 that the operation of the automatic sequence circuit for the integrator is initiated by push-button 206 and the contacts associated with the timer push-button PB-1 remain open. Accordingly, a different sequence of operation, differing from that described in connection with the timer arrangement is used.

In this circuit, relay R-4 and associated contacts 212 and 136 control the operation. Relay R-4 is energized from the potential at 208 and 210 through the following circuit: Lead 214, contact 29C, lead 216, back to point 210.

Energization of relay R-4 opens contact 136 and closes contact 212. The closing of contact 212 closes a circuit to relay R-1, controlling the inward movement of the backboard. The circuit for relay R-1 is as follows: Lead 220, from limit switch LS-1 (in its upper position), contact 212, lead 222, lead 62, contact 28D, lead 64, 65, 66, 67, through R-1 and lead 68 to main lead 42.

On closing of relay R-1, the backboard moves in to position against the negative holder, thereby tripping limit switch LS-1 to its lower position. The closing of contact 56 will energize vacuum control valve 16 through the same circuit as was used in connection with the time, that is, lead 90, 92, 94, contact 96, lead 98, contact 27B, lead 100, through solenoid 80 and lead 102 to main lead 42.

The application of the vacuum will cause either the diaphragm switch 82 or diaphragm switch 84 to close, depending upon the setting of selector switch 86. Assuming again that the high vacuum switch 82 is selected, the lamp 18 is lit through the following circuit, upon closing of switch 82: from terminal 208, lead 230, contact 29A, lead 110, switch 86, lead 112, switch 82, lead 114, 115, 116, through relay R-2, lead 118, contact 29G, lead 232 to terminal 210.

Lamp 18 remains on until the integrator has received the preselected quantity of light. When this quantity of light is received, the voltage source 208, 210 is interrupted, causing relay R-4 to be de-energized.

De-energization of the relay R-4 closes contact 136 and opens contact 212. At the same time, since there is no potential at 208, 210, the circuit containing relay R-2 is supplied from 208, 210 is de-energized and the lamp 18 goes out.

Closing contact 136 causes the energization of time delay relay R-3 through the same circuit as used in connection with the timer circuit, that is: from lead 90, through leads 130, contact 48, lead 132, contact 27D, lead 134, through relay R-3, lead 135, contact 136, and lead 138 to main lead 42.

As in connection with the timer control, contact 96 associated with relay R-3 opens, to change the vacuum to a pressure supply and, after delay, contact 140 closes to energize relay R-1, energizing the motor 10 to withdraw the backboard.

*Manual operation*

In manual operation, neither the timer button PB-1 nor the integrator PB-3 are used.

The first step of the operation is to move selector switch to press in position in which contact 28A is closed. It will be observed that contact 28A closing will connect relay R-1 into the circuit through the following circuit: from limit switch LS-1 (in its upper position), lead 72, lead 300, contact 28A, lead 302, leads 66, 67, through R-1, lead 68 to main lead 42. Backboard 12 will, thereupon, move in with pressure being supplied through vacuum control valve 16. When the backboard moves to its extreme "in" position, limit switch LS-1 will move to open contact 54 and close contact 56, thereby de-energizing relay R-1.

Selector switch 28 is moved to vacuum in position closing contacts A and C. The vacuum control valve solenoid 80 will be energized through the following circuit to impart a vacuum between the plate and negative: Contact 56, lead 90, 92, contact C, lead 304, lead 100, through vacuum control solenoid 80 and lead 102 to main lead 42.

Depressing timer button PB-1 will energize timer clutch 34 and cause the moving pointer on the timer to swing to the preselected position, thereby closing switches 44, 46 and opening switch 48. The timer motor 104 and lamp 18 will be energized as previously described in connection with the timer circuit operation.

At the end of the pre-determined timer cycle, the backboard will not automatically return and the vacuum will not automatically change to pressure in view of the fac' that contact 27D which formed a part of the circuit for this operation is now opened, since the manual-automatic switch has been set to manual. However, when the timer pointer moves back to its completed position, timer switches 44 and 46 will open and switch 44 will close. The opening of switches 44 and 46 shuts off the timer motor and deenergizes relay R-2 which operates the lamp 18.

Before turning the selector switch to press out, it is switched to the press in position to open contact C, thereby de-energizing the vacuum control valve solenoid 80. Vacuum is thus changed to pressure. The selector switch is then turned to "press out" position which closes contacts B and D.

The selector switch 28 is set at press out position closing contacts B and D. Contact 28C has thus been opened, releasing the energization of vacuum control valve solenoid 80 to switch the vacuum to pressure. Simultaneously, relay R-1 is energized through the following circuit to return the backboard to its "out" position: Lead 90, 142, contact B, lead 310, contact 27A, lead 312, 67, through relay R-1, lead 68 to main lead 42.

Manual operation with the integrator is the same except that, when the backboard is moved to in position, and the selector switch 28 has been shifted to vacuum in position, integrator push-button PB-3 is pushed to operate the lamp 18. The lamp 18 is operated in the usual manner until a preselected quantity of light is received at which point, the circuit opens as previously described.

Again, the automatic switching of the vacuum and withdrawal of the backboard is precluded since the contact 27D needed for that operation is opened.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:

1. In a photocomposing machine having a supporting frame for a negative; a backboard for supporting a press-plate or the like and movable into gas tight engagement with said frame; an air pump for changing the pressure between said negative and said press plate; and an electric light source positionable opposite said negative; an automatic sequence control for operating said machine and providing a printing cycle; electrically operated valve means for selectively connecting the pressure and vacuum sides of said pump to said negative and said press plate, electrical means for moving said backboard into and out of engagement with said frame before and after a printing cycle respectively, and control means automatically switching said pump supply to pressure during movement of said backboard in and out, said control means applying vacuum only when said backboard is in engagement with said frame, said control means including relay means operable at the end of a printing cycle and having a first contact for switching said pump supply to pressure, a second contact for energizing said electrical backboard moving means, and time delay means associated with said second contact whereby said backboard moves out of engagement with said frame only after pressure has been applied between said negative and pressplate.

2. In a photocomposing machine having a supporting frame for a negative, a backboard for supporting a pressplate or the like and movable into gas tight engagement with said frame, an air pump for changing the pressure between negative and said pressplate, and an electric light source positionable opposite said negative, an automatic sequence control device for operating said machine and providing a printing cycle; electrically operated valve means for selectively connecting the pressure and vacuum sides of said pump to said negative and said press plate, means for moving said backboard into and out of engagement with said frame, and a motor operated timer for determining the length of time of said timing cycle, circuit means connecting said timer to said valve, said moving means and said light, through a plurality of contacts, said timer including means to open and close at least a portion of said contacts automatically, said contacts operable to energize said timer motor and light only during said timing cycle and to switch said valve from "vacuum" to "pressure" at the end of said timing cycle.

3. A machine according to claim 2 in which said contacts comprise two normally open contacts connecting said timer motor and said light source to a source of electrical energy, and a normally closed contact connecting a relay to said source of electrical energy, said relay operating said pump control valve and means for moving said contacts from their normal positions at the beginning of said timing cycle and returning them to their normal positions at the end of said timing cycle.

4. In a photocomposing machine having a supporting frame for a negative; a backboard for supporting a pressplate or the like and movable into gas tight engagement with said frame; an air pump for changing the pressure between said negative and said press plate; and an electric light source positionable opposite said negative; an automatic sequence control for operating said machine and providing a printing cycle; electrically operated valve means for selectively connecting the pressure and vacuum sides of said pump to said negative and said press plate, electrical means for moving said backboard into and out of engagement with said frame before and after a printing cycle respectively, and control means automatically switching said pump supply to pressure during movement of said backboard in and out, said control means applying vacuum only when said backboard is in engagement with said frame, means for starting said printing cycle after a predetermined value of vacuum has been attained; said control means including relay means operable at the end of a printing cycle and having a first contact for switching said pump supply to pressure, a second contact for energizing said electrical backboard moving means, and time delay means associated with said second contact whereby said backboard moves out of engagement with said frame only after pressure has been applied between said negative and pressplate.

5. In a photocomposing machine having a supporting frame for a negative, a backboard for supporting a pressplate or the like and movable into gas tight engagement with said frame, an air pump for changing the pressure between said negative and said press plate, and an electric light source positionable opposite said negative, the improvement comprising; electrically operated valve means for selectively connecting the pressure and vacuum sides of said pump to the space between said negative and said press plate, means for moving said backboard into and away from contact with said frame, and controls for switching said pump supply to pressure in said space slightly before and during movement of said backboard away from said frame, said controls including a switch to permit vacuum in said space only when said backboard is in contact with said frame, said controls further including a time delay means to assure that said backboard will not move away from said frame until after pressure has been applied to said space.

References Cited in the file of this patent

UNITED STATES PATENTS

| 612,550 | Schwarz | Oct. 18, 1898 |
| 1,200,753 | Neff | Oct. 10, 1916 |
| 1,865,262 | Koppe | June 28, 1932 |
| 1,999,831 | Cooper | Apr. 30, 1935 |
| 2,374,469 | Wekeman | Apr. 24, 1945 |
| 2,380,962 | Garroway | Aug. 7, 1945 |
| 2,616,331 | Pavelle | Nov. 4, 1952 |
| 2,739,516 | Hosterman | Mar. 27, 1956 |